United States Patent
Miki et al.

(10) Patent No.: US 8,311,550 B2
(45) Date of Patent: Nov. 13, 2012

(54) RADIO COMMUNICATION CONTROL METHOD, BASE STATION APPARATUS AND USER APPARATUS

(75) Inventors: Nobuhiko Miki, Yokohama (JP); Yoshihisa Kishiyama, Yokosuka (JP); Satoshi Nagata, Yokosuka (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 339 days.

(21) Appl. No.: 12/665,362

(22) PCT Filed: Jun. 16, 2008

(86) PCT No.: PCT/JP2008/060998
§ 371 (c)(1),
(2), (4) Date: Apr. 7, 2010

(87) PCT Pub. No.: WO2008/156062
PCT Pub. Date: Dec. 24, 2008

(65) Prior Publication Data
US 2010/0184447 A1   Jul. 22, 2010

(30) Foreign Application Priority Data
Jun. 19, 2007 (JP) .................. 2007-161949

(51) Int. Cl.
*H04W 72/04* (2009.01)
*H04W 88/02* (2009.01)
(52) U.S. Cl. .................. 455/450; 370/329; 455/561
(58) Field of Classification Search .................. 455/450, 455/561, 445, 509, 507, 69.23, 187.1; 370/329, 370/220, 252, 330, 343, 328, 203, 471, 344, 370/500, 208, 480, 335, 254; 709/201, 205
See application file for complete search history.

(56) References Cited

U.S. PATENT DOCUMENTS

| | | | |
|---|---|---|---|
| 7,639,660 B2 * | 12/2009 | Kim et al. ............ | 370/343 |
| 8,102,802 B2 * | 1/2012 | Ratasuk et al. ............ | 370/329 |
| 8,134,966 B2 * | 3/2012 | Nagata et al. ............ | 370/329 |
| 2003/0099280 A1 * | 5/2003 | Kumar et al. ............ | 375/130 |
| 2005/0031044 A1 * | 2/2005 | Gesbert et al. ............ | 375/259 |
| 2005/0135324 A1 * | 6/2005 | Kim et al. ............ | 370/343 |
| 2005/0220002 A1 * | 10/2005 | Li et al. ............ | 370/208 |

(Continued)

FOREIGN PATENT DOCUMENTS
JP   2006-314110 A   11/2006
(Continued)

OTHER PUBLICATIONS

Alcatel-Lucent, et al., "Distributed DL Transmission Way Forward," 3GPP TSG RAN1 #49, R1-072610, May 2007, 2 pages.
(Continued)

*Primary Examiner* — Melody Mehrpour
(74) *Attorney, Agent, or Firm* — Osha Liang LLP

(57) ABSTRACT

The base station apparatus includes: a distributed transmission determination unit (12) configured to determine a number ($N_{DRB}$) of resource blocks to be used for data transmission of a distributed transmission scheme for a user apparatus at predetermined time interval; and a division number determination unit (13) configured to variably determine a division number of one resource block according to the determined number of resource blocks of the distributed transmission scheme. As a configuration example, a control information generation unit (19) may be provided for reporting the determined division number to the user apparatus.

22 Claims, 13 Drawing Sheets

U.S. PATENT DOCUMENTS

| | | | |
|---|---|---|---|
| 2007/0064669 A1* | 3/2007 | Classon et al. | 370/347 |
| 2007/0171864 A1* | 7/2007 | Zhang et al. | 370/329 |
| 2007/0217362 A1* | 9/2007 | Kashima et al. | 370/330 |
| 2007/0217540 A1* | 9/2007 | Onggosanusi et al. | 375/267 |
| 2007/0258540 A1* | 11/2007 | Ratasuk et al. | 375/267 |
| 2007/0293172 A1* | 12/2007 | Shi et al. | 455/187.1 |
| 2007/0293229 A1* | 12/2007 | Khan | 455/450 |
| 2008/0192847 A1* | 8/2008 | Classon et al. | 375/260 |
| 2009/0028260 A1* | 1/2009 | Xiao et al. | 375/260 |
| 2009/0041148 A1* | 2/2009 | Li et al. | 375/267 |
| 2009/0168711 A1* | 7/2009 | Fukuoka et al. | 370/329 |
| 2009/0303944 A1* | 12/2009 | Fukuoka et al. | 370/329 |
| 2010/0046445 A1* | 2/2010 | Sawahashi et al. | 370/329 |
| 2010/0167772 A1* | 7/2010 | Fukui et al. | 455/509 |
| 2010/0246498 A1* | 9/2010 | Lim et al. | 370/329 |
| 2011/0058526 A1* | 3/2011 | Seo et al. | 370/329 |
| 2011/0134856 A1* | 6/2011 | Seo et al. | 370/329 |
| 2012/0147846 A1* | 6/2012 | Ho et al. | 370/330 |

FOREIGN PATENT DOCUMENTS

WO 2007/091519 A1 8/2007

OTHER PUBLICATIONS

NTT DoCoMo, et al., "Distributed FDMA Transmission for Shared Data Channel in E-UTRA Downlink," 3GPP TSG RAN WG1 LTE Ad Hoc, R1-061921, Jun. 2006, 15 pages.

Kddi, et al., "L1/L2 Control Channel Structure with CDM Based Multiplexing in E-UTRA Downlink," 3GPP TSG RAN WG1 #46, R1-062171, Sep. 2006, 7 pages.

Patent Abstracts of Japan, Publication No. 2006-314110, dated Nov. 16, 2006, 1 page.

NTT DoCoMo, et al., "RB-level Distributed Transmission Method for Shared Data Channel in E-UTRA Downlink," 3GPP TSG RAN WG1 Meeting #50, R1-073687, Aug. 2007, 6 pages.

Motorola, "Way forward for mapping of DL distributed transmissions to physical resource blocks," 3GPP TSG RAN WG1 #49bis, R1-072686, Jun. 2007, 4 pages.

Motorola, "Downlink distributed transmission summary," 3GPP TSG RAN1 #50, R1-073393, Aug. 2007, 2 pages.

International Search Report issued in PCT/JP2008/060998, mailed on Aug. 19, 2008, with translation, 9 pages.

Written Opinion issued in PCT/JP2008/060998, mailed on Aug. 19, 2008, 5 pages.

NTT DoCoMo, et al., "Comparison between RB-level and Sub-carrier-level Distributed Transmission for Shared Data Channel in E-UTRA Downlink," 3GPP TSG RAN WG1 Meeting #46, R1-062089, Aug. 28-Sep. 1, 2006, 14 pages.

NTT DoCoMo, et al., "Comparison between RB-level and Sub-carrier-level Distributed Transmission for Shared Data Channel in E-UTRA Downlink," 3GPP TSG RAN WG1 Meeting #49, R1-072431, May 2007, 13 pages.

* cited by examiner

FIG.2

| PRB INDEX → | 0 | 1 | 2 | 3 | 4 | 5 | 6 | 7 | 8 | 9 | 10 | 11 |
|---|---|---|---|---|---|---|---|---|---|---|---|---|
| $N_{DRB}=0$ | 0 | 1 | 2 | 3 | 4 | 5 | 6 | 7 | 8 | 9 | 10 | 11 |
| $N_{DRB}=2$ | 0,6 | 1 | 2 | 3 | 4 | 5 | 0,6 | 7 | 8 | 9 | 10 | 11 |
| $N_{DRB}=4$ | 0,6 | 1 | 2 | 3,9 | 4 | 5 | 0,6 | 7 | 8 | 3,9 | 10 | 11 |
| $N_{DRB}=6$ | 0,6 | 1 | 2,8 | 3 | 4,10 | 5 | 0,6 | 7 | 2,8 | 9 | 4,10 | 11 |

FIG.7

FIG.8A
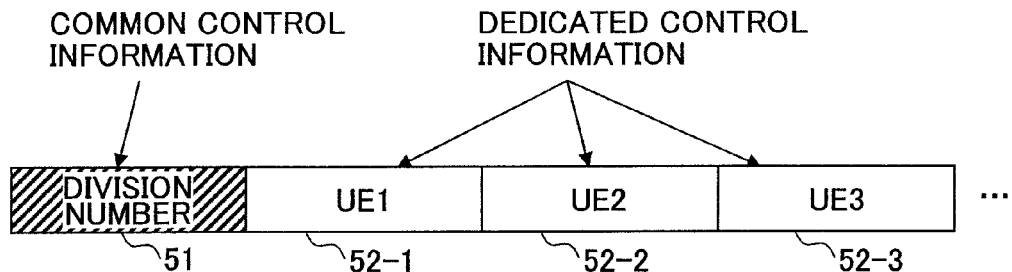
FIG.8B
⟨ # PROCESSING OF UE1 (DISTRIBUTED TRANSMISSION)⟩
⟨ # PROCESSING OF UE2 (DISTRIBUTED TRANSMISSION)⟩
⟨ # PROCESSING OF UE3 (LOCALIZED TRANSMISSION)⟩
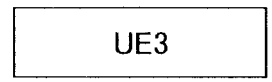

FIG.9A
DIVISION NUMBER (PREPARED IN DEDICATED FIELD)
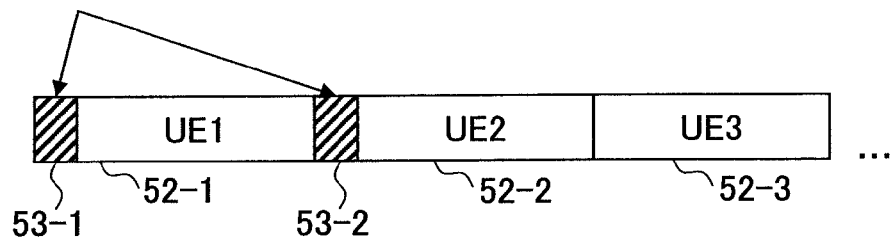
FIG.9B
⟨ # PROCESSING OF UE1 (DISTRIBUTED TRANSMISSION)⟩
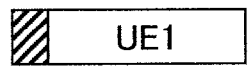
⟨ # PROCESSING OF UE2 (DISTRIBUTED TRANSMISSION)⟩
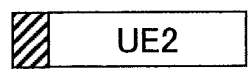
⟨ # PROCESSING OF UE3 (LOCALIZED TRANSMISSION)⟩
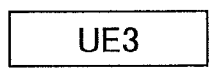

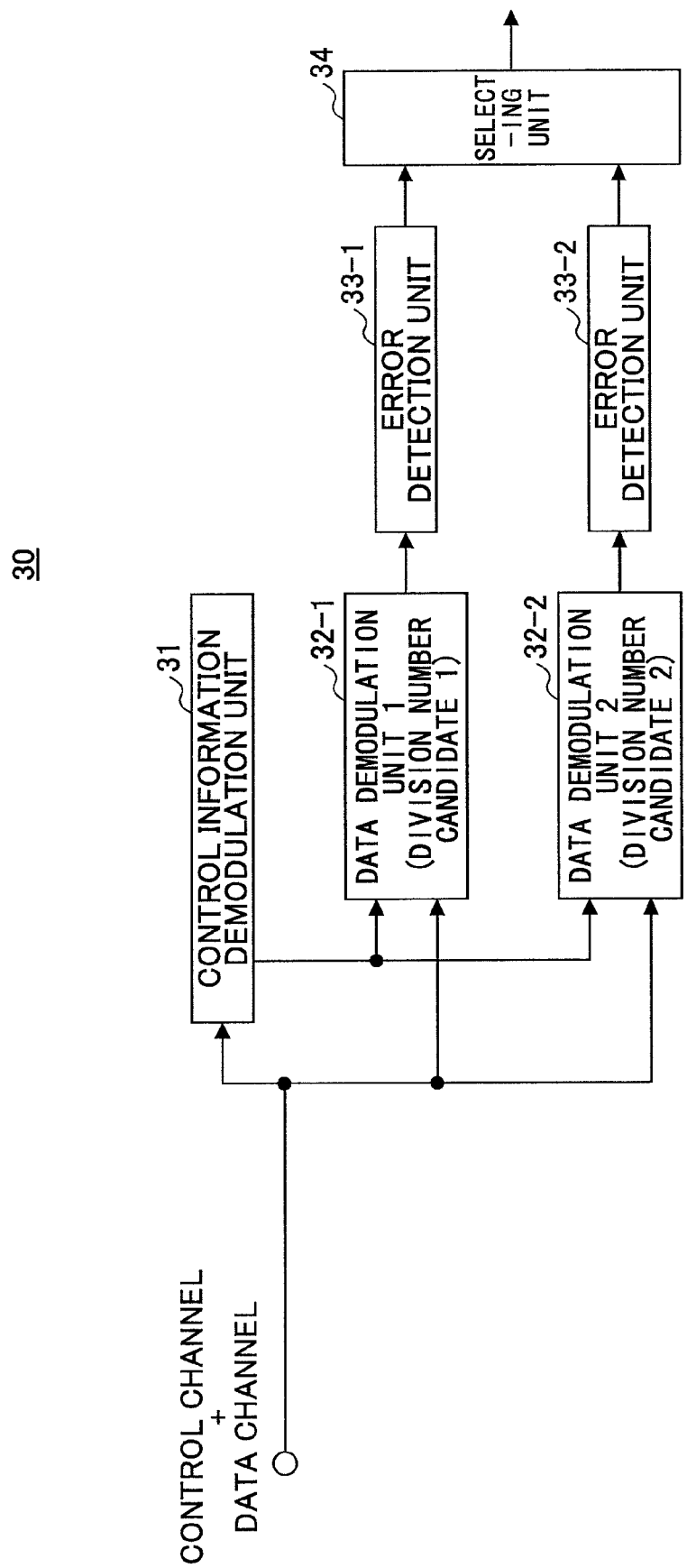

| BANDWIDTH | DIVISION NUMBER OF RB |
|---|---|
| 1.25MHz | 2 |
| 5MHz | 3 |
| 10MHz | 3 |
| 20MHz | 3 |

RADIO COMMUNICATION CONTROL METHOD, BASE STATION APPARATUS AND USER APPARATUS

TECHNICAL FIELD

The present invention generally relates to a mobile communication technique. More particularly, the present invention relates to a radio communication control method including efficient transmission control of radio resources when performing distributed transmission in which data is transmitted while distributing the data by using divided resource blocks, and relates to configurations of a base station apparatus and a user apparatus.

BACKGROUND ART

Demand for data services of higher speed and larger capacity is increasing as mobile terminals such as mobile phones become widespread and as multimedia expands. Especially, the orthogonal frequency division multiplexing (OFDM) scheme is considered to be a promising access scheme because demand for higher speed and larger capacity in the downlink is strong, and because efficient use of wide frequency bands is desired.

In the OFDMA, band is divided into chunks called resource blocks (RB) so as to frequency-multiplex a plurality of users. As assignment/transmission schemes for resource blocks, two schemes which are a localized RB scheme and a distributed RB scheme are defined (refer to non-patent document 1, for example).

In the localized RB scheme, contiguous bands are preferentially assigned to users in good channel state locally on a frequency axis. This scheme is advantageous for communication performed by a user of small mobility and is advantageous for high-quality and high-capacity data transmission and the like.

In the distributed RB scheme, a downlink signal is generated and transmitted by distributing subdivided frequency components over a wideband. According to this scheme, frequency diversity can be expected, so that this scheme is advantageous for data transmission by a user of large mobility, and for periodical transmission of small-sized data like voice packets (VoIP).

As shown in FIG. 1, in both of the localized RB scheme and the distributed RB scheme, each resource block assigned by the base station (cell) is specified by a resource block number (RB index). In the example shown in FIG. 1, in the localized RB scheme, if it is specified that a resource block of the RB number 2 is assigned, it is uniquely specified that resources of a physical resource block number 2 are actually used. When the base station specifies that a RB number 2 is assigned in the distributed RB scheme, it is uniquely specified that the left half of the physical resource block number 2 and the left half of the physical resource block number 8 are used. A relative resource block number assigned by the base station may be called "virtual resource block number" in a sense of distinguishing from the actual physical resource block number.

In addition, as shown in FIG. 2, it is proposed to allow coexistence of both of the localized RB scheme and the distributed RB scheme according to situations of users (refer to non-patent document 2, for example). When assignment and transmission of the distributed RB scheme become necessary for a user (for example, when starting high-speed movement), a part of localized RBs assigned by the base station is replaced with distributed RBs. Assuming that the number of resource blocks replaced by the distributed RBs is $N_{DRB}$, positions used for distributed transmission are determined by a division number irrespective of $N_{DRB}$. More particularly, a k-th block and a (k+6)-th block form a pair, and the pair is not changed irrespective of $N_{DRB}$.

In the conventional method, when performing distributed transmission, the number (division number) of blocks into which one physical resource block is divided is determined in a fixed manner for each cell. The user apparatus recognizes mapping relationship between resource block numbers assigned by the base station in the distributed transmission and actual physical resource block positions, by using a broadcast channel and the like. In each user apparatus, after receiving, from the base station, a notification that the user apparatus is a target of distributed transmission in the current TTI, the user apparatus can receive, demodulate and decode a data channel at corresponding physical resource block positions based on the assigned virtual resource block numbers and the division number which is determined in a fixed manner.

[Non-patent document 1] 3GPP, R1-062089, NTT DoCoMo, et al. "Comparison between RB-level and Sub-carrier-level Distributed Transmission for Shared Data Channel in E-UTRA Downlink".

[Non-patent document 2] 3GPP TSG RAN WG1 #49, Kobe, Japan, May 7-11, 2007, R1-072431, NTT DoCoMo, et al.

DISCLOSURE OF THE INVENTION

Problem to be Solved by the Invention

When the division number is determined in a fixed manner as mentioned above, waste occurs if the number of total resource blocks assigned to a user in the distributed scheme is not an integral multiple of the division number of the resource block (in the above-mentioned example, since the resource block is divided into 2, the division number is 2). For examples, as shown in FIG. 3, in the case when the resource block number $N_{DRB}$ for distributed transmission (for example, resource assignment to a user moving at high speed) is 5 and the fixed division number is 2, the resource block cannot be divided into 2 for distribution unless 6 resource blocks are reserved by incrementing $N_{DRB}$ to 6.

In the example shown in FIG. 3, there is no data transmission in the right half of the physical resource block number 4 and the right half of the physical resource block number 10, so that efficiency decreases by one physical resource block. Similar waste continues to occur when $N_{DRB}$ changes to 3 or 9 as time passes. Such deterioration of the efficiency becomes remarkable when increasing the division number in order to obtain frequency diversity effects, because probability that $N_{DRB}$ becomes an integral multiple of the division number decreases.

In addition, in the case when a plurality of bandwidths can be used according to transmission conditions, if the division number is set to be fixed, there is a fear that transmission efficiency deteriorates when the bandwidth changes. The reason is as follows. When the bandwidth is large, frequency diversity effect can be easily realized by increasing the division number. But, data transmission efficiency deteriorates even by subdividing the resource blocks when the bandwidth is narrow.

An object of the present invention is to provide a resource assignment control method which can eliminate resource waste and can maintain frequency diversity effect.

Means for Solving the Problem

In order to overcome the problem, the division number of one resource block is not fixed when performing distributed transmission, and the division number is adaptively (dynamically) changed according to the number $N_{DRB}$ of resource blocks of the distributed scheme or according to using bandwidth.

In the configuration for adaptively changing the division number of the resource block when performing distributed transmission, the user apparatus needs to know the current division number in order to receive and decode a distributed-transmitted data channel addressed to the user apparatus at proper physical resource blocks. As methods for detecting the division number by the user apparatus, there are:

(1) a method for reporting the division number from the base station to the user apparatus as control information at each transmission time interval TTI; and (2) a method for detecting the division number in a blind manner by the user apparatus.

Further, as the method (1) for reporting division number, there are (1a) a method for reporting the division number as common control information by preparing a control channel field common to a plurality of users, and (1b) a method for preparing a field for reporting the division number in dedicated control information for each user. In the former case, every user apparatus to which distributed transmission is assigned decodes the field of the common control information necessarily.

On the other hand, in the case in which the division number is changed according to the using bandwidth, as a method for ascertaining the current division number by the user apparatus, the division number is associated with each using bandwidth beforehand, so that both of the base station and the user apparatus recognizes the correspondence relationship, and the user apparatus determines the division number based on bandwidth information broadcasted from the base station.

More particularly, according to a first aspect, the base station apparatus includes:

a distributed transmission determination unit configured to determine a number ($N_{DRB}$) of resource blocks to be used for data transmission of a distributed transmission scheme for a user apparatus at predetermined time interval; and a division number determination unit configured to variably determine a division number of one resource block according to the determined number of resource blocks of the distributed transmission scheme.

According to a second aspect, the base station apparatus includes:

a distributed transmission determination unit configured to determine a user apparatus which requires distributed transmission in which data is distributed using divided resource blocks for transmission; and a division number determination unit configured to variably determine a division number of one resource block according to a frequency bandwidth which is being used when there is the user apparatus which requires the distributed transmission.

Each of base station apparatuses of the above-mentioned embodiments may be configured to further include a control information generation unit configured to generate control information for reporting the determined division number to one or more user apparatuses.

In this case, the control information generation unit includes the division number into the control information as common control information common to the one or more user apparatuses. Or, the control information generation unit may be configured to include the division number into the control information as dedicated control information which is to be reported individually to each of the one or more user apparatuses.

According to a third aspect, a configuration of a user apparatus is provided in the case when the division number is not reported. The user apparatus includes:

a control information demodulation unit configured to demodulate control information indicating data transmission of a distributed scheme in which data is distributed using divided resource blocks;

a plurality of data demodulation units provided according to a number of candidates of division number of the resource block which is adaptively selected for data transmission of the distributed scheme, each of the data demodulation units being configured to, when receiving the control information, extract and demodulate a data channel using a division number of a corresponding candidate; and a selecting unit configured to select a best demodulation result from among outputs of the plurality of data demodulation units, and output the result.

According to a fourth aspect, a configuration of a user apparatus is provided in the case when the division number is changed according to the using bandwidth. The user apparatus includes:

a control information demodulation unit configured to demodulate control information indicating data transmission of a distributed scheme in which data is distributed using divided resource blocks;

a broadcast information demodulation unit configured to demodulate broadcast information indicating a current use bandwidth;

a division number determination unit configured to determine a division number of the resource block based on the demodulated broadcast information; and a data demodulation unit configured to extract the data from a received signal based on the control information and the division number, and demodulate the data.

According to a fifth aspect, a radio communication control method is provided for performing distributed transmission using a division number according to the number of resource blocks used for the distributed transmission. This method includes the steps of:

determining a number ($N_{DRB}$) of resource blocks to be transmitted using a distributed transmission scheme to one or more user apparatuses at predetermined time interval; and variably determining a division number of one resource block according to the determined number of distributed resource blocks.

According to a sixth aspect, a radio communication control method is provided for performing distributed transmission using a division number according to the using bandwidth. This method includes the steps of:

determining whether it is necessary to perform distributed transmission in which data is distributed using divided resource blocks for transmission for one or more user apparatuses; and variably determining a division number of one resource block according to a frequency bandwidth which is being used when it is determined that the distributed transmission is necessary.

In either method, a step of generating control information for reporting the determined division number to the one or more user apparatuses may be included. In this case, the division number may be included into the control information as common control information common to the one or more user apparatuses, and the division number may be included into the control information as dedicated control information which is to be reported individually to each of the one or more user apparatuses.

Effect of the Present Invention

By adaptively changing the division number of the resource block when performing distributed transmission, wasted resources which causes no data transmission can be reduced as much as possible, so that data transmission efficiency improves.

BRIEF DESCRIPTION OF THE DRAWINGS

FIG. 2 is a diagram showing relationship between the number $N_{DRB}$ of resource blocks for distributed transmission and positions of the physical resource blocks for distributed transmission;

FIG. 7 is a diagram showing an example of distributed transmission using the variable division number according to the value of $N_{DRB}$;

FIG. 8A is a diagram showing an example of a reporting method of the division number from the base station to the user apparatus;

FIG. 8B is a diagram showing an example of a reporting method of the division number from the base station to the user apparatus;

FIG. 9A is a diagram showing an example of a reporting method of the division number from the base station to the user apparatus;

FIG. 9B is a diagram showing an example of a reporting method of the division number from the base station to the user apparatus;

FIG. 10 is a diagram showing a configuration example of a user apparatus which performs blind detection for detecting the division number in the first embodiment;

Figure 1:
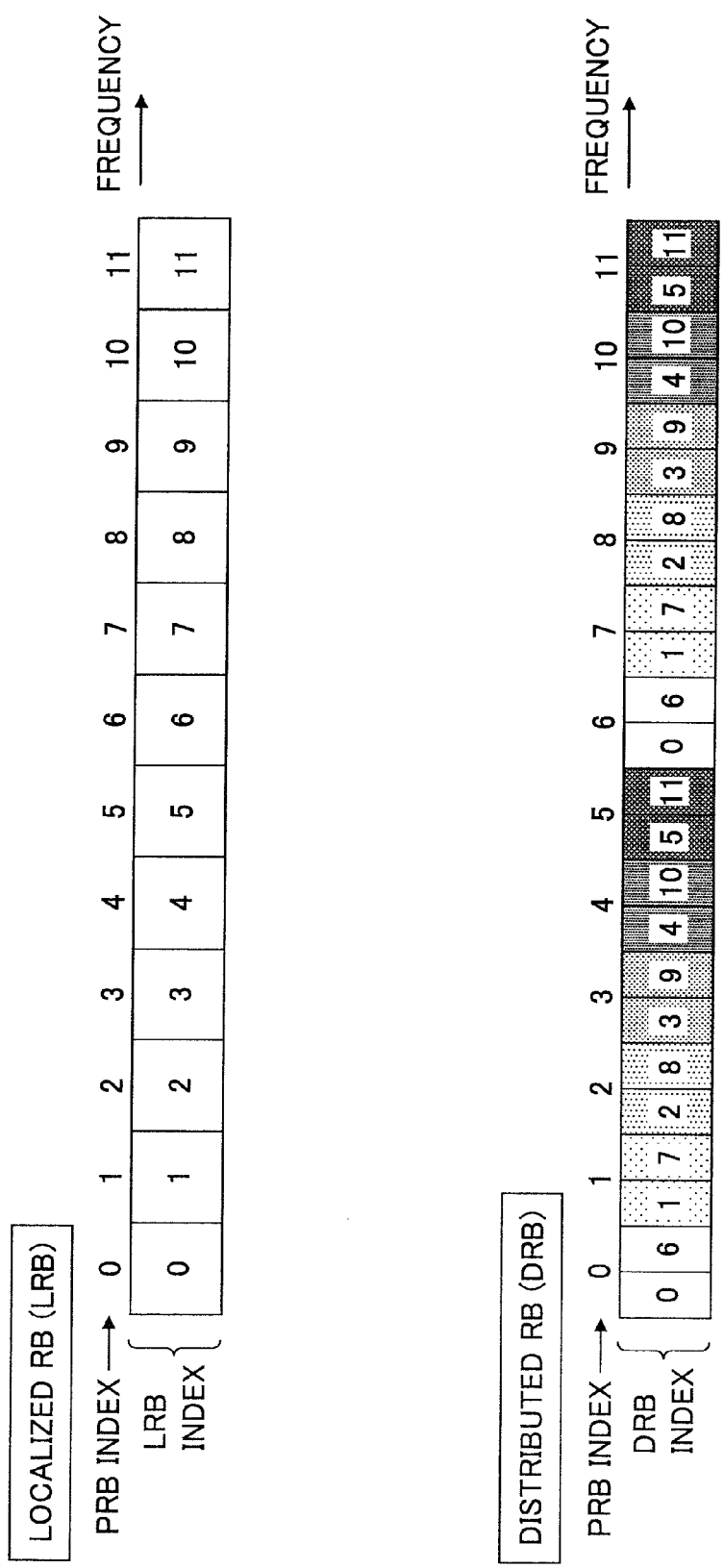
FIG. 1 is a diagram showing assignment of resource blocks in the localized RB scheme and the distributed RB scheme.
Figure 3:
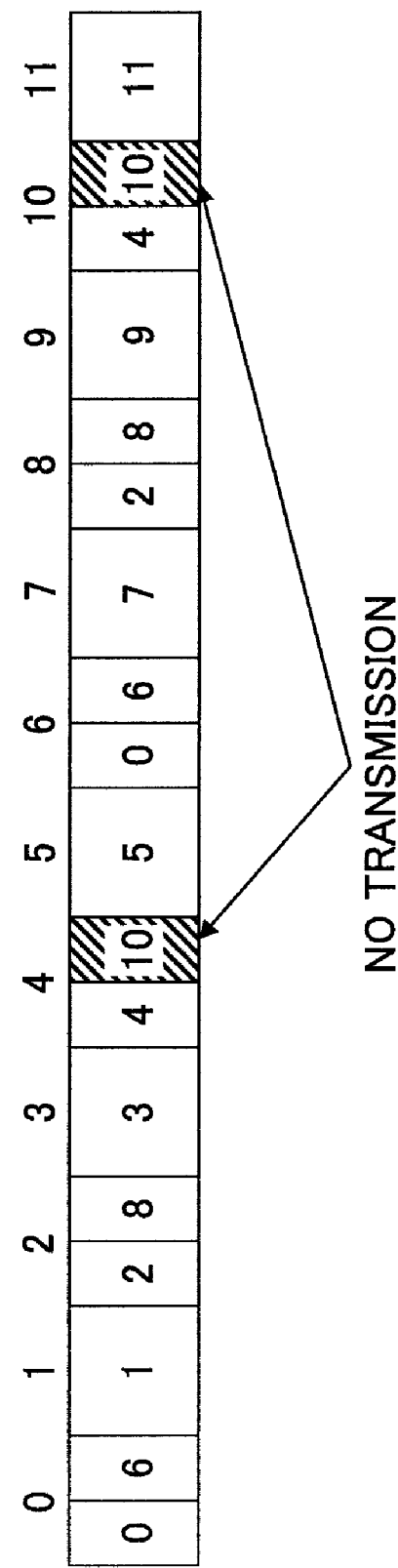
FIG. 3 is a diagram for explaining a problem in conventional setting of the division number in a fixed manner.

DESCRIPTION OF REFERENCE SIGNS 10A, 10B base station apparatus
11 scheduler
12 $N_{DRB}$ determination unit (distributed transmission determination unit)
13A, 13B division number determination unit
15 $N_{DRB}$—division number correspondence table
17-1-17-*n* data generation processing unit
19 control information generation processing unit
20 multiplexing unit
25 bandwidth-division number correspondence table
26 broadcast information generation unit
30, 40 user apparatus
31 control information demodulation unit
32-1, 32-2 data demodulation unit
33-1, 33-2 error detection unit
34 selecting unit
41 broadcast channel demodulation unit
42 control channel demodulation unit
43 data demodulation/decoding unit
45 bandwidth-division number correspondence table (division number determination unit)
51 common control information field
52-1-52-3 dedicated control information field
53-1-53-2 dedicated division number field

PREFERRED EMBODIMENTS FOR CARRYING OUT THE INVENTION

In the following, preferred embodiments of the present invention are described with reference to figures.

First Embodiment

Figure 4:
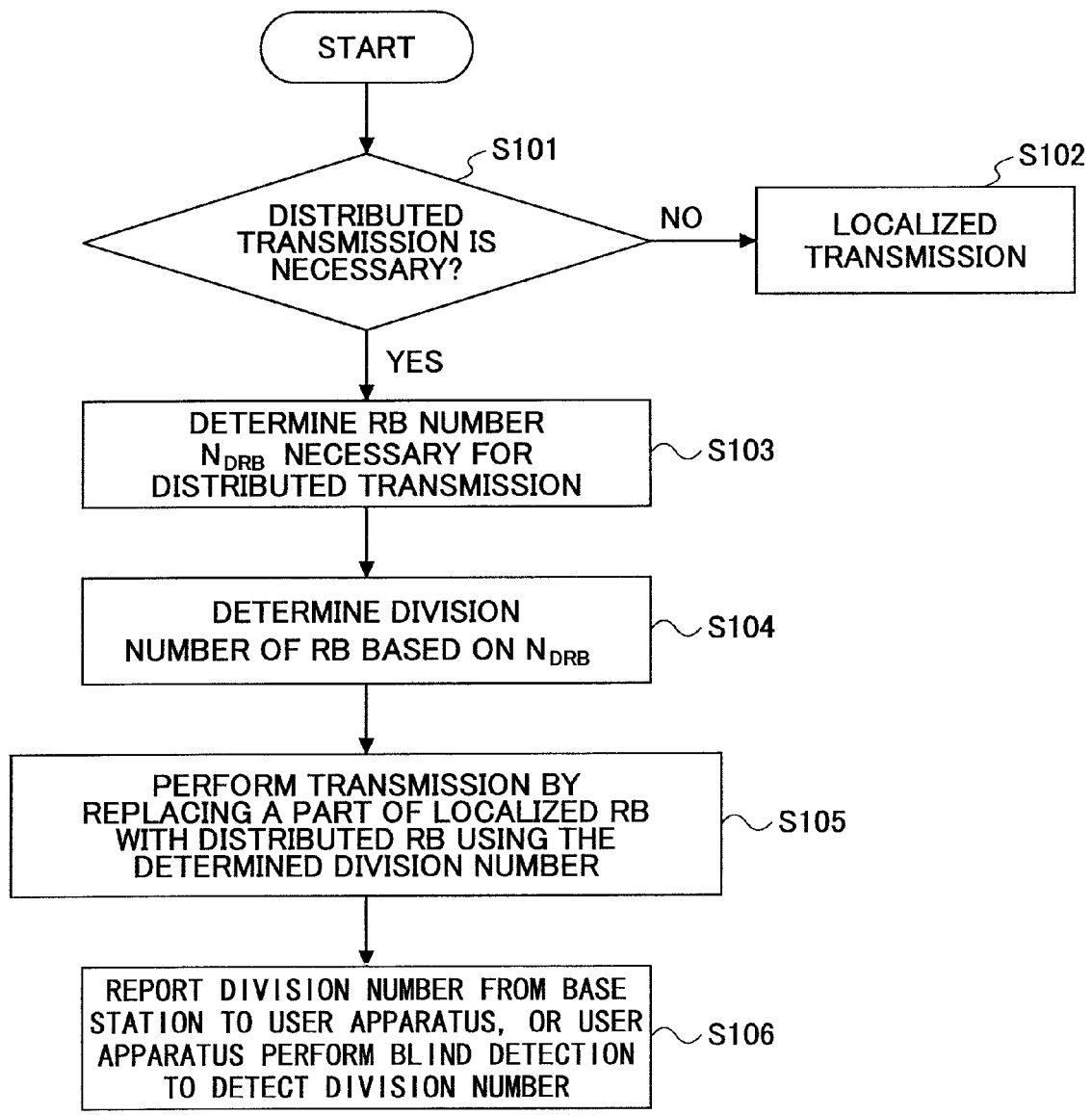
FIG. 4 shows a flowchart of distributed transmission using the variable division number in the first embodiment.

FIG. 4 is a flowchart of the distribute transmission method according to the first embodiment of the present invention. In the first embodiment, the division number of the resource block is adaptively determined according to the number $N_{DRB}$ of resource blocks to be used for distributed transmission.

First, in step S101, necessity of distributed transmission is determined at a TTI of transmission timing. The determination is performed in the base station for each user apparatus in a cell based on the communication quality (SINR etc.), moving speed, QoS and the like. For example, when the moving speed of the user apparatus exceeds a predetermined speed, or when voice communication is performed, distributed transmission is determined to be necessary. When mobility is small, or when there are only users who transmit large capacity data with high quality, distributed transmission is determined to be unnecessary.

When the distributed transmission is unnecessary, localized transmission is performed (S102). When the distributed transmission is necessary, the number $N_{DRB}$ (to be referred to as "distributed RB number") of total resource blocks assigned to the distributed transmission is determined (S103). $N_{DRB}$ is a sum total of resource block sizes (numbers) necessary for data transmission of target users of the distributed transmission. By the way, for a user who requires a plurality of resource blocks for data transmission, separated physical resource blocks can be assigned without dividing the resource block while maintaining the state of localized RB. Therefore, users targeted for the distributed transmission can be limited to users requiring assignment of only one resource block. But, from the viewpoint of enhancing frequency diversity effect, a user requiring assignment of more than one resource block can be determined to be a target user for the distributed transmission.

When the distributed RB number $N_{DRB}$ is determined, the division number of the resource block is determined according to the value (S104). The division number can be obtained by storing necessary correspondence relationship between the distributed RB number $N_{DRB}$ and the division number in the base station beforehand. In this case, for example, $N_{DRB}$ is associated with the division number such that the division number is 2 when $N_{DRB}$ is 2, the division number is 3 when $N_{DRB}$ is 3, and the division number is 2 when $N_{DRB}$ is 4, and the like. Then, the number $N_{DRB}$ of localized RBs are replaced with distributed RBs based on a pattern according to the obtained division number, so that the distributed RBs are transmitted (S105).

The base station reports the division number to the user apparatus using a control channel, or instead of reporting the division number, the division number is detected by the user apparatus by performing blind detection (S106). The method for reporting the division number is described later.

Figure 5:
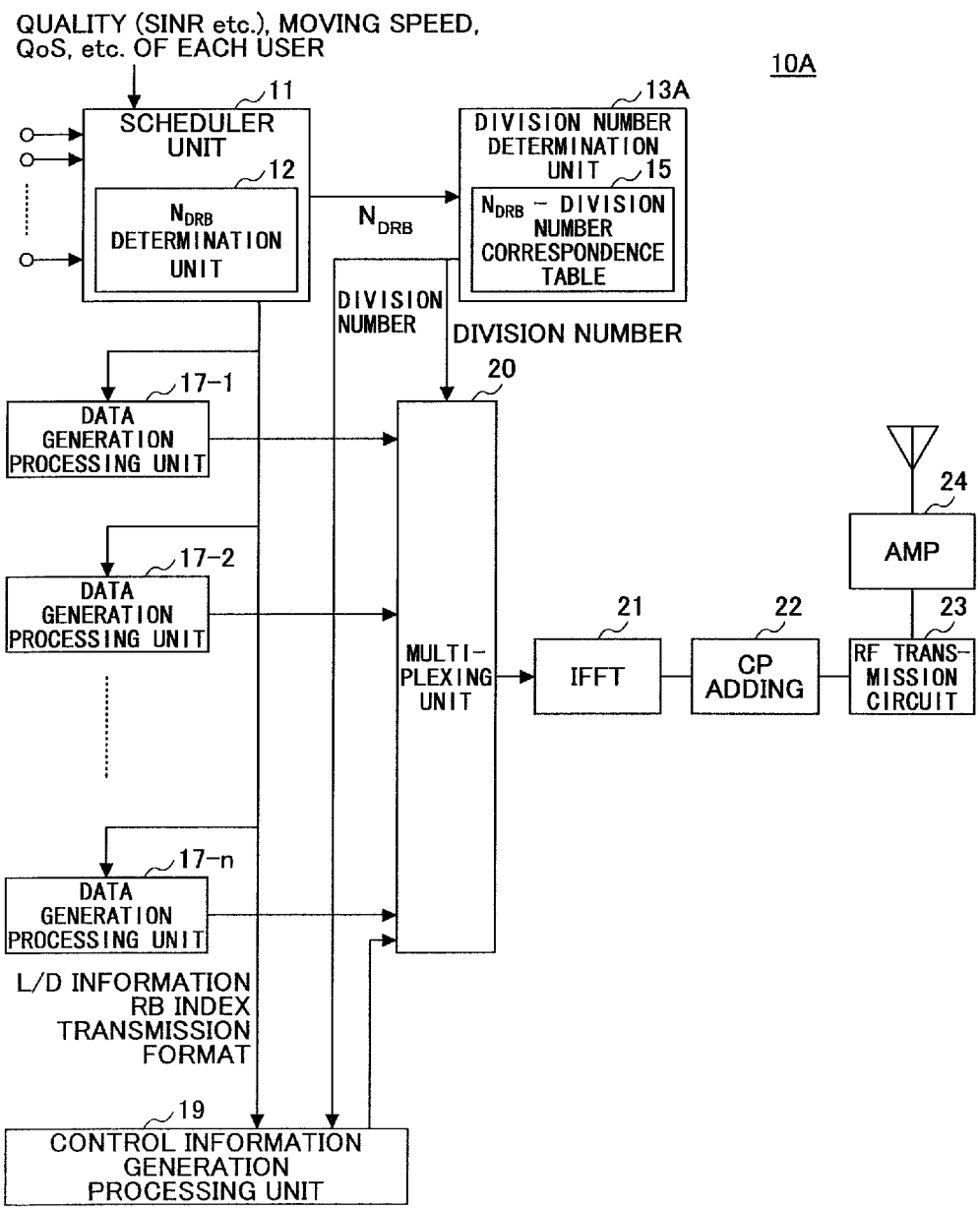
FIG. 5 is a schematic block diagram of a base station used in the first embodiment.

FIG. 5 is a schematic block diagram of the base station apparatus 10A used in the first embodiment. The base station apparatus 10A includes a scheduler 11, a division number determination unit 13A, data generation processing units 17-1-17-$n$ for each user, a control information generation processing unit 19, and a multiplexing unit 20. The scheduler 11 receives transmission data addressed to each user apparatus from a buffer which is not shown in the figure, and the scheduler 11 receives user apparatus information such as user quality (SINR etc.), requested service quality QoS, moving speed $f_D$ and the like which have been received in the uplink and demodulated.

The distributed RB number ($N_{DRB}$) determination unit 12 determines whether there is a user requiring distributed transmission in a current TTI based on the received user apparatus information. If there is such a user, the distributed RB number ($N_{DRB}$) determination unit 12 determines the total resource block number $N_{DRB}$ used for the distributed transmission. When there is no user requiring the distributed transmission, $N_{DRB}$=0. In this since, the $N_{DRB}$ number determination unit can be more broadly called as "distributed transmission determination unit". The determined $N_{DRB}$ is input to the division number determination unit 13A as a parameter representing a radio communication state in the current TTI.

Figure 6:
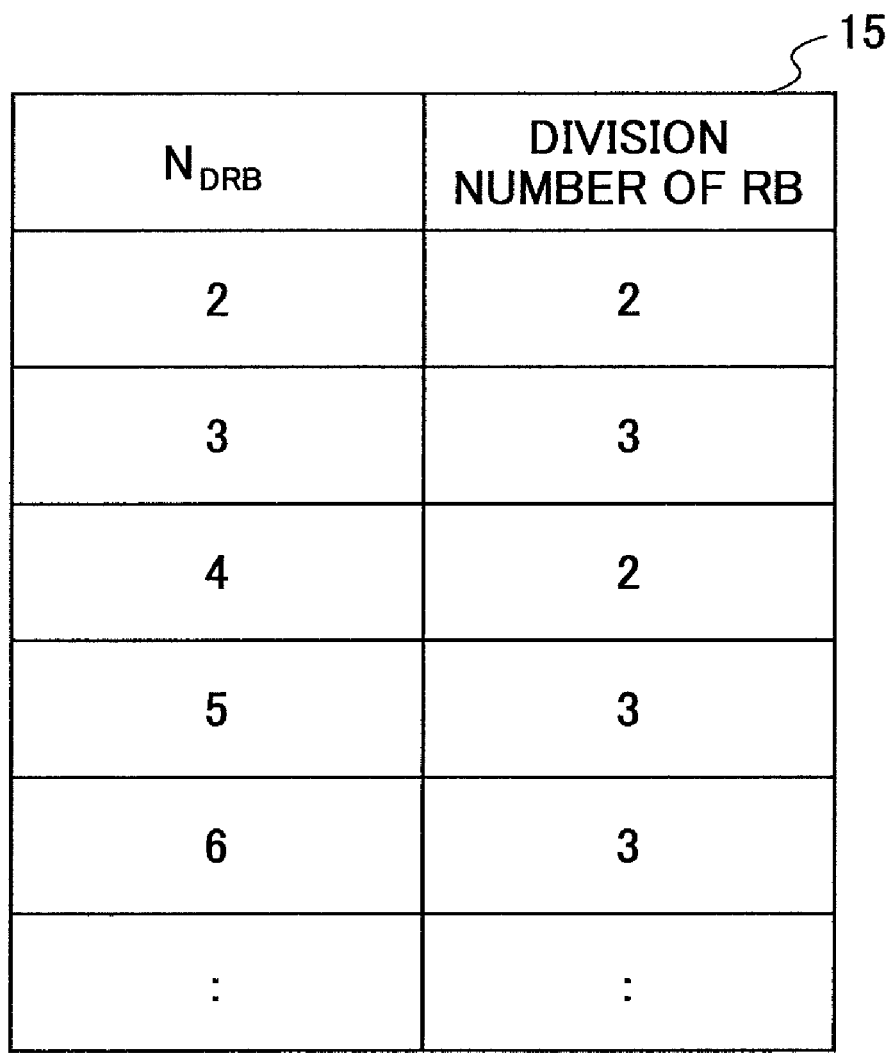
FIG. 6 shows an example of a $N_{DRB}$-division number correspondence table used in the base station shown in FIG. 5.

The division number determination unit 13A determines the division number according to $N_{DRB}$ based on a $N_{DRB}$-division number correspondence table 15, and outputs the determined division number to the control information generation unit 19 and the multiplexing unit 20. FIG. 6 shows an example of the $N_{DRB}$-division number correspondence table 15. In this example, the resource block is divided into 2 when $N_{DRB}$ is 2 and 4, and the resource block is divided into 3 when $N_{DRB}$ is 3, 5 and 6.

The scheduler 11 determines which resource block and what kind of transmission scheme are used for transmitting a data channel for each of user apparatuses (which include a user apparatus of a target of distributed transmission and a user apparatus of a target of localized transmission), and the scheduler 11 provides the determined information to the control information generation processing unit 19. The input information to the control information generation unit 19 includes information (L/D information) indicating whether a user is a target of distributed transmission or a target of localized transmission, assigned resource block numbers, transmission format, and the like.

Each data generation processing unit 17 generates a data signal with a resource block size (number) determined by the scheduler 11, and performs channel coding and data modulation using a predetermined coding rate and modulation scheme, for each corresponding user apparatus.

The control information generation processing unit 19 generates a control channel based on the L/D information of each user, assigned RB number and transmission format information received from the scheduler 11 and based on the division number information received from the division number determination unit 13A. Then, the control information generation processing unit 19 performs channel coding and modulation for the control channel.

The multiplexing unit 20 maps (multiplexes), onto a frequency axis, a control channel, data channels for a plurality of users, and other physical channels (not shown in the figure) as necessary. The multiplexing unit 20 includes a pattern for mapping into physical resource blocks, so that the multiplexing unit 20 performs user multiplexing based on the division number supplied from the division number determination unit 13A. The multiplexed signal is modulated by inverse Fourier transform in the inverse fast Fourier transform unit 21. Then, a guard interval is added using a cyclic prefix scheme in the CP adding unit 22, and, D/A conversion, RF conversion and band limitation and the like are performed by the RF transmission circuit 23. Then, transmission power is adjusted by the power amplifier 24, so that the signal is transmitted from the antenna.

In the example shown in FIG. 5, although the scheduler 11 and the division number determination unit 13A are separated, the division number determination unit 13A may be embedded into the scheduler 11 as a unit.

Figure 7:
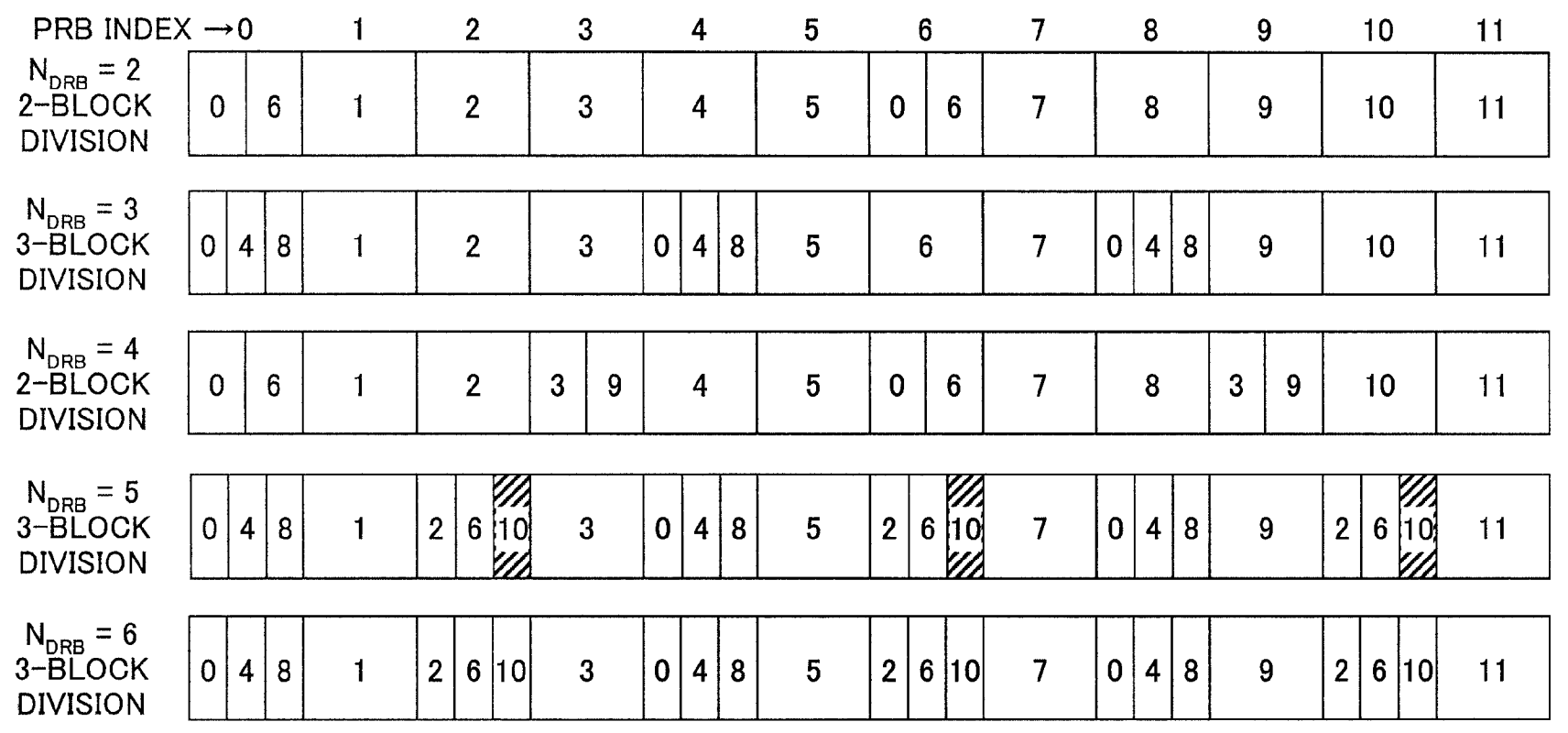

FIG. 7 is a diagram showing an example of distributed transmission based on variable division number according to the value of $N_{DRB}$. When $N_{DRB}$=2 and $N_{DRB}$=4, the resource (frequency) is distributed by dividing into 2 for transmission. When $N_{DRB}$=3, 5 and 6, the resource (frequency) is distributed by dividing into 3. Although not shown in the figure, when $N_{DRB}$=8, the resource may be divided into 2. But, when sufficient bandwidth is provided, high frequency diversity effect can be achieved by dividing the resource into 4.

When $N_{DRB}$=5, data is not transmitted in the shaded area (assigned resource block number 10) so that waste of one physical resource block occurs. But, this situation is limited only to the case when the number of resource blocks for the distributed transmission is 5 in a TTI. If the number is changed to $N_{DRB}$=4, the division number is also changed to 2 according to the change, so that the waste is eliminated. Therefore, compared to the conventional method in which 2-block division or 3-block division is set in a fixed manner, the transmission efficiency is remarkable improved.

FIG. 8A shows a first reporting method (1a) for reporting the division number to the user apparatus from the base station apparatus 10A in each TTI. In the first reporting method, a field 51 which is common to user apparatuses which are targets of the distributed transmission is prepared in a control channel. Every use apparatus which is the target of the distributed transmission demodulates the field 51 for this common control information. Information indicating whether a user apparatus is a target of the distributed transmission is inserted into dedicated control information fields 52-1, 52-2 and 52-3 for UE1, UE2 and UE3 respectively. For example, by providing one bit area in the field 52 for each user apparatus, information (L/D) indicating whether to apply distributed transmission or localized transmission is embedded into the one bit area. Such control channel is generated by the control information generation processing unit 19.

In the example of FIG. 8A, distributed transmission is performed for the user apparatuses UE1 and UE2, and localized transmission is performed for UE3. As shown in FIG. 8B, the user apparatus UE1 recognizes that assignment has been performed for UE1 since the control channel includes the field UE1 (52-1) corresponding to the ID number of UE1. Then, the user apparatus UE1 extracts L/D information and assigned resource block number form the dedicated control information field 52-1. In addition to that, the dedicated control information field 52-1 includes control information such as modulation method and channel coding rate and the like.

After the user apparatus UE1 detects that the user apparatus UE1 is a target of the distributed transmission by the L/D information, the user apparatus UE1 demodulates the common control information field 51 so as to recognize the division number in the current TTI. Similarly, the user apparatus UE2 recognizes that the user apparatus UE2 is a target of the distributed transmission based on the control information field 52-2, and demodulates the common control information field 51. On the other hand, the user apparatus UE3 detects that it is a target of the localized transmission, and the user apparatus UE3 does not demodulate the common control information field 51.

FIG. 9A shows a second reporting method (1a) for reporting the division number in each TTI from the base station apparatus 10A to the user apparatus. In the second reporting method, a dedicated field 53 indicating the division number is provided for each user apparatus which is the target of the distributed transmission. In this example, as shown in FIG. 9B, the use apparatuses UE1 and UE2 are provided with dedicated division number fields 53-1 and 53-2 addressed to the respective apparatuses. Thus, each of the user apparatuses recognizes that it is a target of the distributed transmission, so that the user apparatuses can receive and demodulate data at distributed proper positions in actual physical resource blocks by using the resource block numbers included in the dedicated control information fields 52-1 and 52-2, and the division number in the current TTI included in the division number fields 53-1 and 53-2. Since there is no dedicated division number field for the user apparatus UE3, the user apparatus UE3 recognizes that localized transmission is performed, and receives and demodulates user data at actual positions of the physical resource blocks specified from the assigned resource block numbers.

FIG. 10 shows a configuration example of the user apparatus 30 when the user apparatus detects the division number in a blind manner. In this case, the base station transmits, to each user apparatus, control information such as information indicating that distributed transmission is performed, assigned RB number, modulation method and channel coding rate and the like without reporting the division number. Therefore, in this case, in the configuration of FIG. 5, the input line from the division number determination unit 13A to the control information generation processing unit 19 is not provided.

The user apparatus 30 includes a control channel demodulation unit 31 and data demodulation units 32-1,32-2, . . . according to the number of division number candidates to be used. For example, assuming that the division number is adaptively changed between 2 and 3 (2-block division and 3-block division) in the system of the present invention, a data demodulation unit 1 (32-1) and a data demodulation unit 2 (32-2) are provided since the number of division number candidates is 2. By the way, when the user apparatus 30 is a target of the localized transmission in the current TTI, only a single data demodulation unit 32 is used. In the present embodiment, processing when the user apparatus is a target of the distributed transmission is described.

The control information demodulation unit 31 extracts the control channel from a received signal which has been converted to a base band signal, and demodulates the control channel, so that it is recognized that the user apparatus 30 is a target of the distributed transmission in a current TTI. Further, the control information demodulation unit 31 demodulates the RB number assigned to the user apparatus 30 and transmission format information, and provides each pieces of the information to each of the data demodulation units 32-1 and 32-2 with LID information.

The first data demodulation unit 32-1 extracts, from the received signal, a downlink data channel addressed to the user apparatus based on the assigned RB number and a first division number candidate (division number 2, for example) received from the control information demodulation unit 31, and the first data demodulation unit 32-1 demodulates the data channel based on the transmission format information received from the control information demodulation unit 31. The first error detection unit 33-1 performs error detection on the data channel which is de-mapped based on the division number 2. By the way, the user apparatus 30 stores mapping relationship between assigned RB number assigned by the base station apparatus 10A and actual physical resource block number in a memory and the like which is not shown in the figure.

The second data demodulation unit 32-2 extracts, from the received signal, the downlink data channel addressed to the user apparatus based on the assigned RB number and a second division number candidate (division number 3, for example) received from the control information demodulation unit 31, and the second data demodulation unit 32-2 demodulates the data channel based on the transmission format information received from the control information demodulation unit 31. The second error detection unit 33-2 performs error detection on the data channel which is de-mapped based on the division number 3.

Outputs of the first and the second detection units 33-1 and 33-2 are connected to inputs of the selecting unit 34. The selecting unit 34 selects one having fewer errors and outputs the selected one. Although two of 2-block division and 3-block division are used as a range of division number variable control in the example shown in FIG. 10, when 4-block division is included in the range of the variable control, a third demodulation unit and a third error detection unit are further used.

Accordingly, in the first embodiment, the number $N_{DRB}$ of resource blocks which require distributed transmission in a TTI is obtained according to state of users in a cell, so that a division number is determined according to the value of $N_{DRB}$, and distributed transmission is performed. Therefore, deterioration of resource efficiency can be decreased largely.

Second Embodiment

Figure 11:
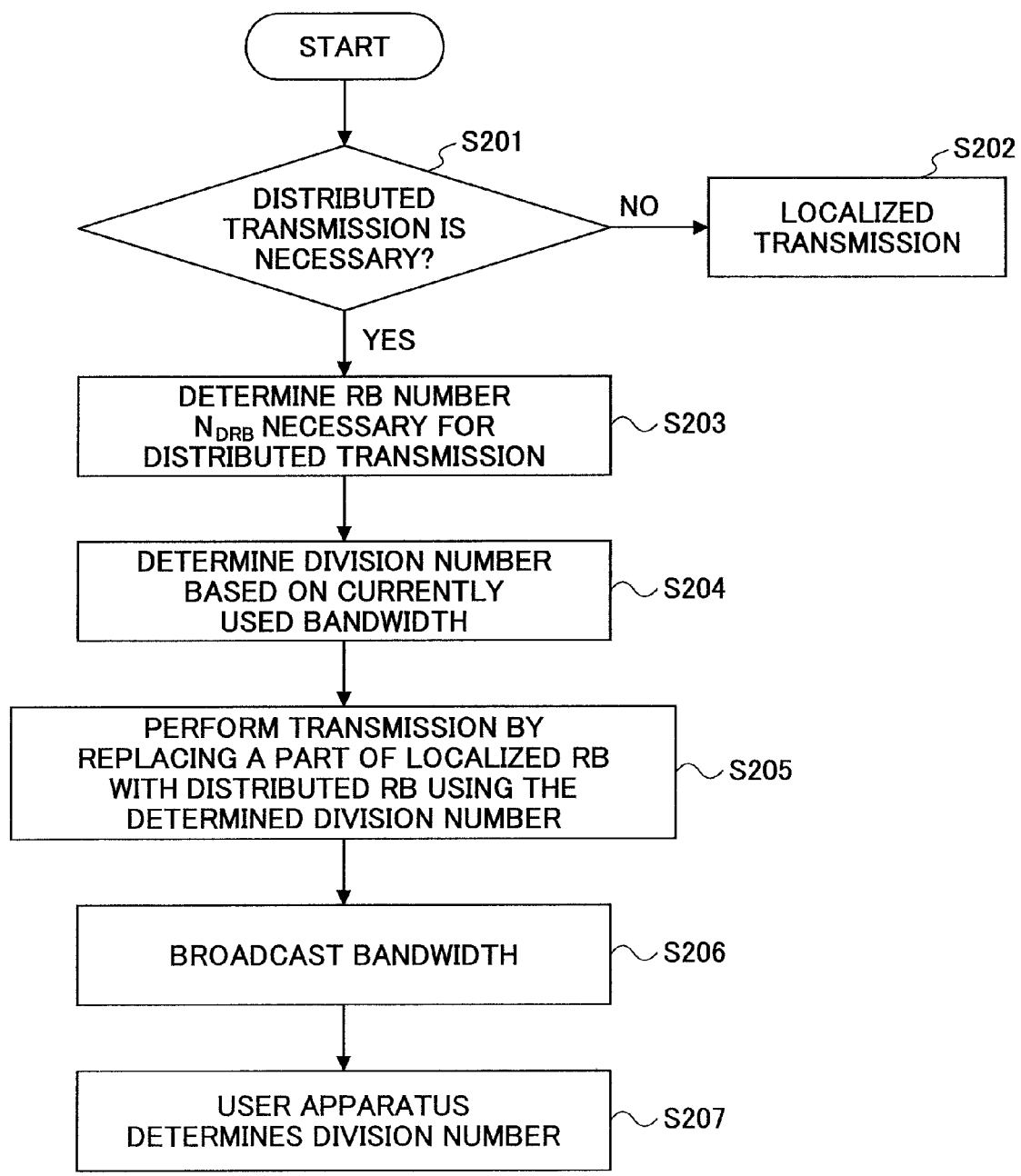
FIG. 11 shows a flowchart of distributed transmission using the variable division number in the second embodiment.

FIG. 11 shows a flowchart of the distributed transmission method according to a second embodiment of the present invention. In the second embodiment, the division number of the resource block is adaptively determined according to the bandwidth to be used.

In multi-band communication, communication is performed by choosing a bandwidth from among a plurality of bandwidths in order to provide optimal transmission condition according to services. Thus, when performing distributed transmission, a proper division number is selected according to the bandwidth used at transmission timing.

First, in step S201, the base station determines necessity of distributed transmission for each user in the cell. When distributed transmission is unnecessary, localized transmission is performed (S202). When distributed transmission is necessary, the base station determines the number $N_{DRB}$ of total resource blocks to be assigned to the distributed transmission (S203). Then, the base station determines the division number of the resource block based on the bandwidth which is being used at the current transmission timing simultaneously with step S203 or sequentially (s204). The base station replaces $N_{DRB}$ localized RBs with distributed RBs using a pattern according to the obtained division number, and transmits the blocks (S205).

The base station reports the current frequency bandwidth using a broadcast channel (S206). The user apparatus determines the division number based on the reported bandwidth (S207).

Figure 12:
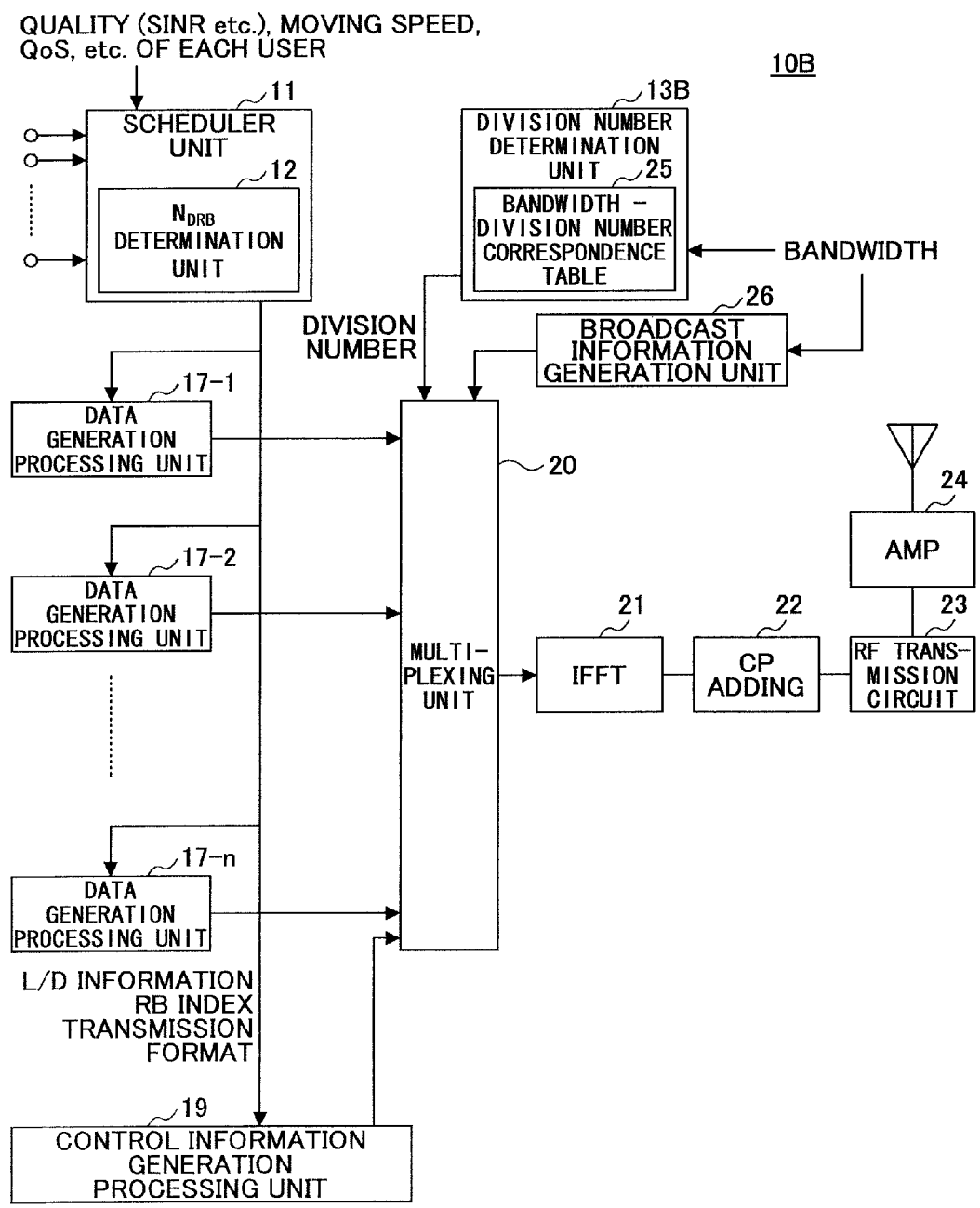
FIG. 12 is a schematic block diagram of a base station used in the second embodiment.

FIG. 12 is a block diagram of a base station apparatus 10B used in the second embodiment. In the second embodiment, the division number determination unit 13B includes a bandwidth-division number correspondence table 25. The bandwidth used by the base station 10B is input to the division number determination unit 13B and to the broadcast information generation unit 26 as information indicating current radio communication state. The division number determination unit 13B determines the current division number based on the bandwidth-division number correspondence table 25, and outputs the determined division number to the multiplexing unit 20. The broadcast information generation unit 26 generates a broadcast channel including bandwidth information.

Figures 13, 14:
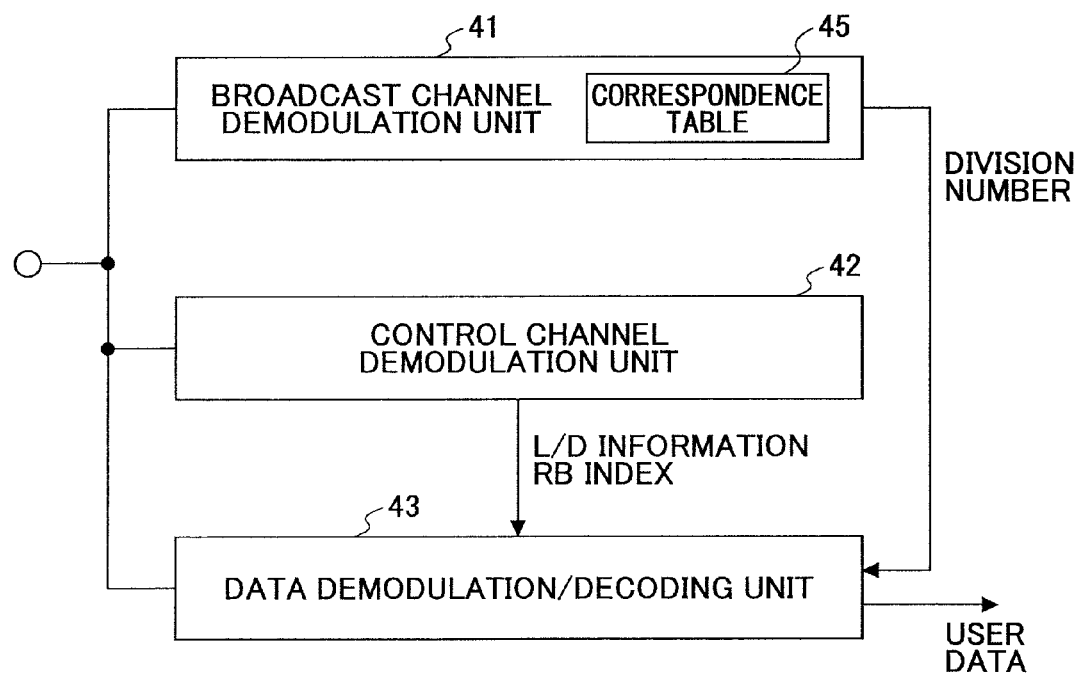
FIG. 13 shows an example of a bandwidth-division number correspondence table used in the base station shown and the user apparatus of the second embodiment.
FIG. 14 is a diagram showing a configuration example of a user apparatus used in the second embodiment.

FIG. 13 shows an example of the bandwidth-division number correspondence table 25. For example, 1.25 MHz, 5 MHz, 10 MHz and 20 MHz are provided as available bandwidths, and division numbers 2, 3, 3 and 3 are set respectively.

The control information generation unit 19 generates a control channel based on L/D information, assigned RB number, transmission format and the line input from the scheduler 11, so as to perform channel coding and modulation.

The multiplexing unit 20 maps (multiplexes), onto a frequency axis, the control channel, data channels for a plurality of users, and the broadcast channel onto a frequency axis. The multiplexing unit 20 includes a mapping pattern for mapping to physical resource blocks, so that the multiplexing unit 20 performs user multiplexing based on the division number supplied from the division number determination unit 13B. The multiplexed signal is modulated by inverse Fourier transform in the inverse fast Fourier transform unit 21. Then, a guard interval is added using a cyclic prefix scheme in the CP adding unit 22, and D/A conversion, RF conversion and band limitation and the like are performed by the RF transmission circuit 23. Then, transmission power is adjusted by the power amplifier 24, so that the signal is transmitted from the antenna.

FIG. 14 shows a schematic block diagram of the user apparatus used in the second embodiment. The user apparatus 40 includes a broadcast channel demodulation unit 41, a control channel demodulation unit 42, a data demodulation/decoding unit 43, and a bandwidth-division number correspondence table 45.

The broadcast channel demodulation unit 41 extracts a broadcast signal from a received signal which has been converted to a baseband signal, and demodulates the broadcast channel. The broadcast channel includes bandwidth information which is currently used. The division number is determined from the bandwidth-division number correspondence table 45 based on the broadcasted bandwidth information. In this sense, the correspondence table 45 functions as a division number determination unit. This correspondence table 45 has information similar to that in the correspondence table of the base station apparatus 10B. For example, the correspondence table 45 is similar to the table shown in FIG. 13. The determined division number is input to the data demodulation unit 43.

The control channel demodulation unit 42 extracts a control channel from the received signal which has been converted to the baseband signal, and demodulates the control channel, so that it is recognized that the user apparatus 40 is a target of the distributed transmission in the current TTI based on the L/D information. In addition, the control channel demodulation unit 42 demodulates the RB number assigned to the user apparatus 40 and transmission format information, and supply them to the data demodulation unit 43 with L/D information.

The data demodulation unit 43 extracts a downlink data channel addressed to the user apparatus from the received signal based on L/D information and assigned RB number received from the control information demodulation unit 42 and based on the division number received from the broadcast channel demodulation unit 41. Then, the data demodulation unit demodulates and decodes the data channel based on the transmission format information received from the control information demodulation unit 42, so as to output user data. By the way, mapping relationship between assigned RB number assigned by the base station and actual physical resource blocks is stored in a memory and the like which is not shown in the figure.

Accordingly, in the second embodiment, the division number is adaptively changed according to the bandwidth which is being used. When a narrow bandwidth is used, transmission cannot be performed efficiently even if the division number is increased. Thus, by adaptively changing the division number according to the bandwidth, the transmission efficiency can be improved as a whole.

The present international application claims priority based on Japanese patent application No. 2007-161949, filed in the JPO on Jun. 19, 2007, and the entire contents of the Japanese patent application No. 2007-161949 is incorporated herein by reference.

The invention claimed is:

1. A base station apparatus comprising:
a distributed transmission determination unit configured to determine a number ($N_{DRB}$) of resource blocks to be used for data transmission of a distributed transmission scheme for a user apparatus at predetermined time interval; and
a division number determination unit configured to variably determine a division number of one resource block according to the determined number of resource blocks of the distributed transmission scheme.

2. A base station apparatus comprising:
a distributed transmission determination unit configured to determine a user apparatus which requires distributed transmission in which data is distributed using divided resource blocks for transmission; and
a division number determination unit configured to variably determine a division number of one resource block according to a frequency bandwidth which is being used when there is the user apparatus which requires the distributed transmission.

3. The base station apparatus as claimed in claim 1, further comprising:
a control information generation unit configured to generate control information for reporting the determined division number to one or more user apparatuses.

4. The base station apparatus as claimed in claim 3, wherein the control information generation unit includes the division number into the control information as common control information common to the one or more user apparatuses.

5. The base station apparatus as claimed in claim 3, wherein the control information generation unit includes the division number into the control information as dedicated control information which is to be reported individually to each of the one or more user apparatuses.

6. The base station apparatus as claimed in claim 1, wherein the division number determination unit includes a correspondence table in which an arbitrary number of distributed resource blocks is associated with the division number beforehand.

7. The base station apparatus as claimed in claim 2, wherein the division number determination unit includes a correspondence table in which frequency bandwidth which is usable in the base station is associated with the division number beforehand.

8. A radio communication control method comprising the steps of:
   determining a number ($N_{DRB}$) of resource blocks to be transmitted using a distributed transmission scheme to one or more user apparatuses at predetermined time interval; and
   variably determining a division number of one resource block according to the determined number of distributed resource blocks.

9. A radio communication control method comprising the steps of:
   determining whether it is necessary to perform distributed transmission in which data is distributed using divided resource blocks for transmission for one or more user apparatuses; and
   variably determining a division number of one resource block according to a frequency bandwidth which is being used when it is determined that the distributed transmission is necessary.

10. The radio communication control method as claimed in claim 8, further comprising:
    a step of generating control information for reporting the determined division number to the one or more user apparatuses.

11. The radio communication control method as claimed in claim 10, wherein the control information generation step includes the division number into the control information as common control information common to the one or more user apparatuses.

12. The radio communication control method as claimed in claim 10, wherein the control information generation step includes the division number into the control information as dedicated control information which is to be reported individually to each of the one or more user apparatuses.

13. The radio communication control method as claimed in claim 8, wherein the division number is determined based on predetermined correspondence relationship between an arbitrary number of distributed resource blocks and the division number.

14. The radio communication control method as claimed in claim 9, wherein the division number is determined based on predetermined correspondence relationship between available frequency bandwidth and the division number.

15. The radio communication control method as claimed in claim 8, further comprising the steps of:
    transmitting control information indicating that the distributed transmission is performed to the one or more user apparatuses; and
    detecting the division number using a blind scheme when the one or more user apparatuses receive the control information.

16. The radio communication control method as claimed in claim 9, further comprising the steps of:
    transmitting control information indicating that the distributed transmission is performed to the one or more user apparatuses;
    broadcasting frequency bandwidth which is used; and
    determining the division number of the resource block based on the broadcasted frequency bandwidth when the one or more user apparatuses receive the control information.

17. The base station apparatus as claimed in claim 2, further comprising:
    a control information generation unit configured to generate control information for reporting the determined division number to one or more user apparatuses.

18. The base station apparatus as claimed in claim 17, wherein the control information generation unit includes the division number into the control information as common control information common to the one or more user apparatuses.

19. The base station apparatus as claimed in claim 17, wherein the control information generation unit includes the division number into the control information as dedicated control information which is to be reported individually to each of the one or more user apparatuses.

20. The radio communication control method as claimed in claim 9, further comprising:
    a step of generating control information for reporting the determined division number to the one or more user apparatuses.

21. The radio communication control method as claimed in claim 20, wherein the control information generation step includes the division number into the control information as common control information common to the one or more user apparatuses.

22. The radio communication control method as claimed in claim 20, wherein the control information generation step includes the division number into the control information as dedicated control information which is to be reported individually to each of the one or more user apparatuses.

* * * * *